(12) United States Patent
Cradit et al.

(10) Patent No.: US 11,220,176 B1
(45) Date of Patent: Jan. 11, 2022

(54) AXLE ASSEMBLY HAVING A GEAR REDUCTION MODULE WITH COUNTERSHAFT GEAR SETS

(71) Applicant: ArvinMeritor Technology, LLC, Troy, MI (US)

(72) Inventors: Jeremy Cradit, Troy, MI (US); Nick Bofferding, Troy, MI (US); David Zueski, Troy, MI (US); Robert Martin, Troy, MI (US); Eric LaMothe, Troy, MI (US); Christopher Keeney, Troy, MI (US); Brian Hayes, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/178,508

(22) Filed: Feb. 18, 2021

(51) Int. Cl.
| | |
|---|---|
| *F16H 3/095* | (2006.01) |
| *B60K 7/00* | (2006.01) |
| *B60K 11/02* | (2006.01) |
| *B60K 17/16* | (2006.01) |
| *F16H 3/54* | (2006.01) |
| *F16H 3/56* | (2006.01) |
| *F16H 37/08* | (2006.01) |
| *F16H 48/08* | (2006.01) |

(Continued)

(52) U.S. Cl.
CPC ............ *B60K 7/0007* (2013.01); *B60B 35/18* (2013.01); *B60K 11/02* (2013.01); *B60K 17/165* (2013.01); *F16H 3/097* (2013.01); *F16H 3/54* (2013.01); *F16H 3/56* (2013.01); *F16H 37/082* (2013.01); *F16H 48/08* (2013.01); *F16H 57/037* (2013.01); *B60K 2001/001* (2013.01); *B60K 2001/006* (2013.01); *B60K 2007/0038* (2013.01); *B60Y 2400/73* (2013.01); *B60Y 2410/10* (2013.01); *F16H 3/095* (2013.01); *F16H 2003/447* (2013.01); *F16H 2048/423* (2013.01); *F16H 2057/02034* (2013.01); *F16H 2057/02052* (2013.01); *F16H 2063/3093* (2013.01); *F16H 2200/0034* (2013.01); *F16H 2200/2005* (2013.01)

(58) Field of Classification Search
CPC . F16H 3/54; F16H 37/082; F16H 3/56; F16H 2200/2005; F16H 2063/3093; F16H 2003/447; F16H 3/093; F16H 3/097; F16H 2200/0021; F16H 3/095; B60B 35/18; B60K 17/165; B60K 17/12; B60K 2001/001
See application file for complete search history.

(56) References Cited

U.S. PATENT DOCUMENTS

| | | | |
|---|---|---|---|
| 1,981,236 A | 11/1934 | Logue | |
| 5,508,574 A * | 4/1996 | Vlock | F16H 3/126 |
| | | | 310/113 |

(Continued)

OTHER PUBLICATIONS

U.S. Appl. No. 16/594,362, filed Oct. 7, 2019; 31 Pages.

(Continued)

*Primary Examiner* — Sherry L Estremsky
(74) *Attorney, Agent, or Firm* — Brooks Kushman PC

(57) ABSTRACT

An axle assembly having a gear reduction unit that is configured to operatively connect an electric motor to a drive pinion. The gear reduction unit includes at least one countershaft gear set. At least one clutch is engageable to provide a torque path between the electric motor and the drive pinion.

20 Claims, 11 Drawing Sheets

(51) Int. Cl.
*F16H 57/037* (2012.01)
*B60B 35/18* (2006.01)
*F16H 3/097* (2006.01)
*B60K 1/00* (2006.01)
*F16H 3/44* (2006.01)
*F16H 48/42* (2012.01)
*F16H 57/02* (2012.01)
*F16H 63/30* (2006.01)

(56) References Cited

U.S. PATENT DOCUMENTS

| | | | |
|---|---|---|---|
| 6,176,146 B1 | 1/2001 | Ore | |
| 7,427,252 B2 * | 9/2008 | Holmes | B60W 10/02 |
| | | | 475/5 |
| 7,798,937 B2 | 9/2010 | Gitt | |
| 11,001,140 B1 * | 5/2021 | Varela | F16C 19/06 |
| 2011/0111910 A1 | 5/2011 | Ideshio et al. | |
| 2014/0311266 A1 | 10/2014 | Nakashima et al. | |
| 2017/0059007 A1 | 3/2017 | Eo et al. | |
| 2018/0015816 A1 | 1/2018 | Robinette et al. | |
| 2018/0112770 A1 | 4/2018 | Hansson et al. | |
| 2019/0054816 A1 | 2/2019 | Garcia et al. | |
| 2019/0054817 A1 | 2/2019 | Garcia et al. | |
| 2019/0054818 A1 | 2/2019 | Garcia et al. | |
| 2020/0173494 A1 | 6/2020 | Smith et al. | |
| 2020/0173531 A1 | 6/2020 | Smith | |
| 2020/0173535 A1 | 6/2020 | Peng et al. | |
| 2020/0173537 A1 | 6/2020 | Begov et al. | |
| 2020/0173541 A1 | 6/2020 | Soffner et al. | |
| 2020/0177049 A1 | 6/2020 | Raya et al. | |
| 2020/0177059 A1 | 6/2020 | Smith et al. | |
| 2021/0101478 A1 * | 4/2021 | Ghatti | B60K 1/00 |

OTHER PUBLICATIONS

U.S. Appl. No. 16/594,702, filed Oct. 7, 2019; 32 Pages.
U.S. Appl. No. 16/594,932, filed Oct. 7, 2019; 33 Pages.
U.S. Appl. No. 16/594,875, filed Oct. 7, 2019; 49 Pages.

* cited by examiner

AXLE ASSEMBLY HAVING A GEAR REDUCTION MODULE WITH COUNTERSHAFT GEAR SETS

TECHNICAL FIELD

This disclosure relates to an axle assembly having at least one countershaft gear set that may operatively connect a rotor to a drive pinion.

BACKGROUND

An axle assembly having an electric motor module is disclosed in U.S. Patent Publication No. 2019/0054816.

SUMMARY

In at least one embodiment an axle assembly is provided. The axle assembly may include an electric motor, a drive pinion, a gear reduction unit, a first clutch, and a second clutch. The electric motor may have a rotor that is rotatable about an axis. The drive pinion may extend through the rotor and may be rotatable about the axis. The gear reduction unit may include a first countershaft gear set, a second countershaft gear set, and a set of drive pinion gears. The first countershaft gear set may include first, second, and third countershaft gears that are fixedly mounted to a first countershaft such that the first, second, and third countershaft gears are rotatable about a first countershaft axis with the first countershaft. The second countershaft gear set may include first, second, and third countershaft gears that are fixedly mounted to a second countershaft such that the first, second, and third countershaft gears of the second countershaft gear set are rotatable about a second countershaft axis with the second countershaft. The set of drive pinion gears may include first, second, and third gears that are rotatable about the axis. The first, second, and third gears may mesh with the first, second, and third countershaft gears, respectively, of the first and second countershaft gear sets. The first gear may be continuously connected to the rotor and may be decoupled from and rotatable with respect to the drive pinion. The second and third gears may be operatively connectable to the drive pinion. The first clutch may selectively connect the second gear and the drive pinion. The second clutch may selectively connect the third gear and the drive pinion.

In at least one embodiment an axle assembly is provided. The axle assembly may include an electric motor, a drive pinion, a gear reduction unit, a first clutch, a second clutch, and a third clutch. The electric motor may have a rotor that is rotatable about an axis. The drive pinion may extend through the rotor and may be rotatable about the axis. The gear reduction unit may include a first countershaft gear set, a second countershaft gear set, and a set of drive pinion gears. The first countershaft gear set may include first, second, and third countershaft gears that are fixedly mounted to a first countershaft such that the first, second, and third countershaft gears are rotatable about a first countershaft axis with the first countershaft. The second countershaft gear set may include first, second, and third countershaft gears that are fixedly mounted to a second countershaft such that the first, second, and third countershaft gears of the second countershaft gear set are rotatable about a second countershaft axis with the second countershaft. The set of drive pinion gears may include first, second, and third gears that are rotatable about the axis. The first, second, and third gears may mesh with the first, second, and third countershaft gears, respectively, of the first and second countershaft gear sets. The first gear may be operatively connectable to the rotor. The second and third gears may be operatively connectable to the drive pinion. The first clutch may selectively connect the rotor and the first gear. The second clutch may selectively connect the second gear and the drive pinion. The third clutch may selectively connect the third gear and the drive pinion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
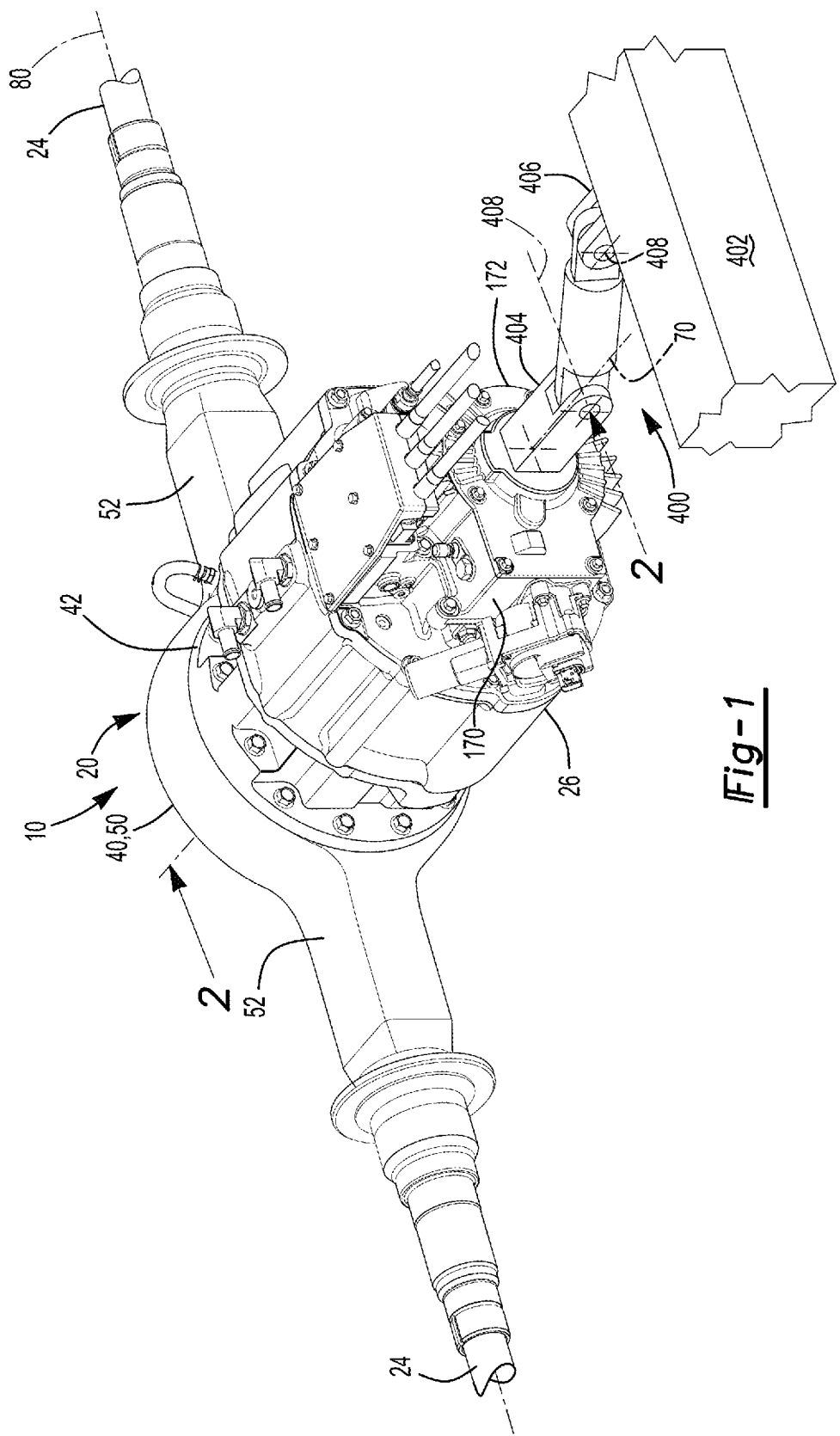
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

Figure 2:
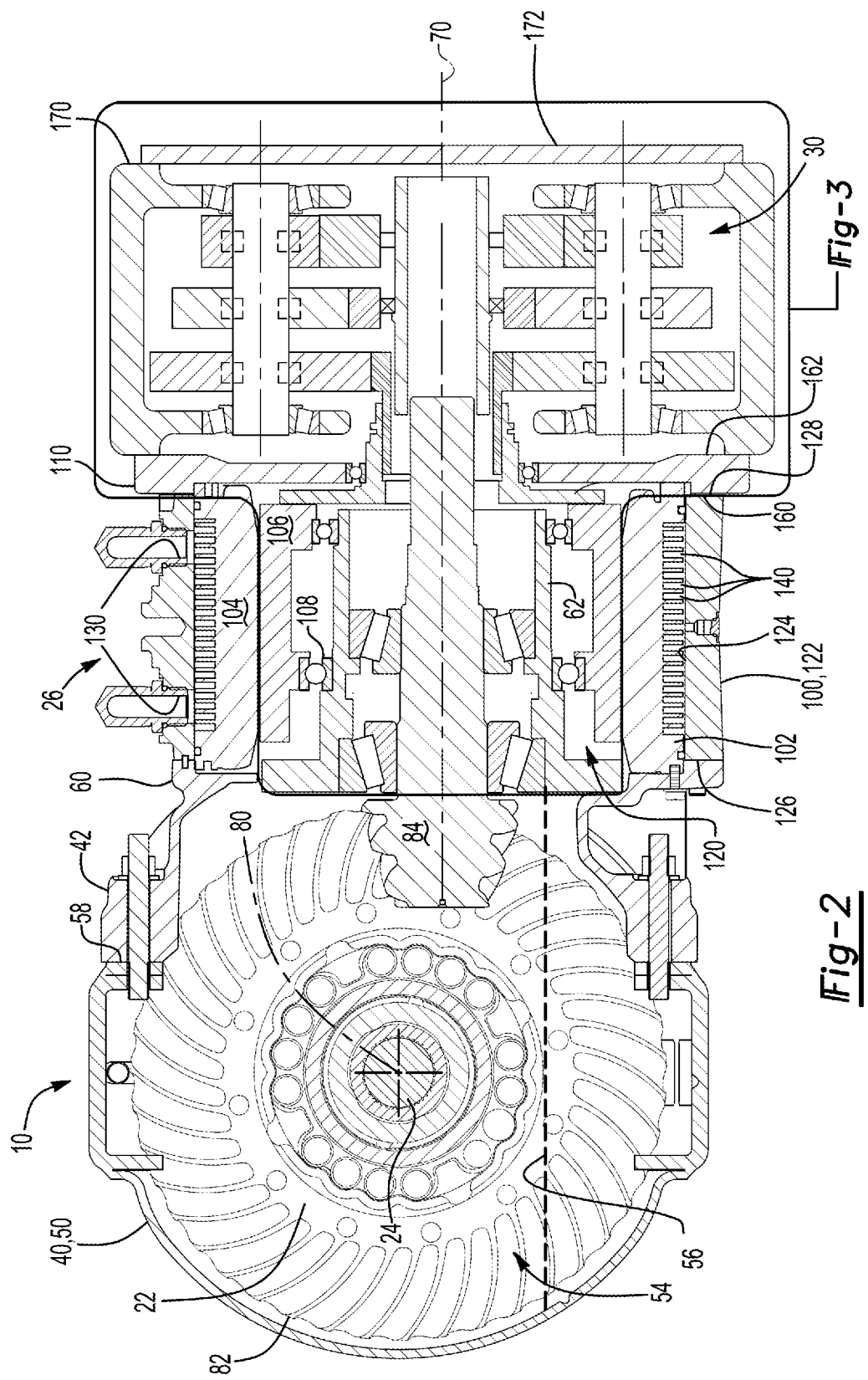
FIG. 2 is a section view of the axle assembly of FIG. 1 along section line 2-2.

One or more axle assemblies may be provided with the vehicle. As is best shown with reference to FIGS. 1 and 2, the axle assembly 10 may include a housing assembly 20, a differential assembly 22, at least one axle shaft 24, and an electric motor module 26. As is best shown in FIG. 2, the axle assembly 10 may include a gear reduction module 30.

Housing Assembly

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

The center portion 50 may be disposed proximate the center of the axle housing 40. The center portion 50 may define a cavity that may at least partially receive the differential assembly 22. As is best shown in FIG. 2, a lower region of the center portion 50 may at least partially define a sump portion 54 that may contain or collect lubricant 56. Lubricant 56 in the sump portion 54 may be splashed by a ring gear of the differential assembly 22 and distributed to lubricate various components.

Referring to FIG. 2, the center portion 50 may include a carrier mounting surface 58. The carrier mounting surface 58 may facilitate mounting of the differential carrier 42 to the axle housing 40. For example, the carrier mounting surface 58 may face toward and may engage the differential carrier 42 and may have a set of holes that may be aligned with corresponding holes on the differential carrier 42. Each hole may receive a fastener, such as a bolt or stud, that may couple the differential carrier 42 to the axle housing 40.

Referring to FIG. 1, one or more arm portions 52 may extend from the center portion 50. For example, two arm portions 52 may extend in opposite directions from the center portion 50 and away from the differential assembly 22. The arm portions 52 may have substantially similar configurations. For example, the arm portions 52 may each have a hollow configuration or tubular configuration that may extend around and may receive a corresponding axle shaft 24 and may help separate or isolate the axle shaft 24 or a portion thereof from the surrounding environment. An arm portion 52 or a portion thereof may or may not be integrally formed with the center portion 50. It is also contemplated that the arm portions 52 may be omitted.

Referring to FIGS. 1 and 2, the differential carrier 42 may be mounted to the center portion 50 of the axle housing 40. The differential carrier 42 may support the differential assembly 22 and may facilitate mounting of the electric motor module 26. For example, the differential carrier may include one or more bearing supports that may support a bearing like a roller bearing assembly that may rotatably support the differential assembly 22. The differential carrier 42 may also include a mounting flange 60 and a bearing support wall 62.

Referring to FIG. 2, the mounting flange 60 may facilitate mounting of the electric motor module 26. As an example, the mounting flange 60 may be configured as a ring that may extend outward and away from an axis 70 and may extend around the axis 70. In at least one configuration, the mounting flange 60 may include a set of fastener holes that may be configured to receive fasteners, such as a bolt or stud, that may secure the electric motor module 26 to the mounting flange 60.

The bearing support wall 62 may support bearings that may rotatably support other components of the axle assembly 10. For example, the bearing support wall 62 may support bearings that may rotatably support a drive pinion 84, bearings that may rotatably support a rotor of the electric motor module 26, or both. The bearing support wall 62 may extend in an axial direction away from the axle housing 40 and may extend around the axis 70. The bearing support wall 62 may define a hole that may extend along or around the axis 70 and receive the drive pinion 84 and the bearings that rotatably support the drive pinion 84. The bearing support wall 62 may be integrally formed with the differential carrier 42 or may be a separate component that is secured or fastened to the differential carrier 42.

Differential Assembly, Drive Pinion, and Axle Shafts

Referring to FIG. 2, the differential assembly 22 may be at least partially received in the center portion 50 of the housing assembly 20. The differential assembly 22 may be rotatable about a differential axis 80 and may transmit torque to the axle shafts 24 and wheels. The differential assembly 22 may be operatively connected to the axle shafts 24 and may permit the axle shafts 24 to rotate at different rotational speeds in a manner known by those skilled in the art. The differential assembly 22 may have a ring gear 82 that may have teeth that mate or mesh with the teeth of a gear portion of the drive pinion 84. Accordingly, the differential assembly 22 may receive torque from the drive pinion 84 via the ring gear 82 and transmit torque to the axle shafts 24.

The drive pinion 84 may provide torque to the ring gear 82. In an axle assembly that includes a gear reduction module 30, the drive pinion 84 may operatively connect the gear reduction module 30 to the differential assembly 22. In at least one configuration, the drive pinion 84 may be rotatable about the axis 70 and may be rotatably supported inside another component, such as the bearing support wall 62.

Referring to FIG. 1, the axle shafts 24 may transmit torque from the differential assembly 22 to corresponding wheel hubs and wheels. Two axle shafts 24 may be provided such that each axle shaft 24 extends through a different arm portion 52 of axle housing 40. The axle shafts 24 may extend along and may be rotatable about an axis, such as the differential axis 80. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Electric Motor Module

Referring to FIG. 2, the electric motor module 26, which may also be referred to as an electric motor, may be mounted to the differential carrier 42 and may be operatively connectable to the differential assembly 22. For instance, the electric motor module 26 may provide torque to the differential assembly 22 via the drive pinion 84 and a gear reduction module 30 as will be discussed in more detail below. The electric motor module 26 may be primarily disposed outside the differential carrier 42. In addition, the electric motor module 26 may be axially positioned between the axle housing 40 and the gear reduction module 30. In at least one configuration, the electric motor module 26 may include a motor housing 100, a coolant jacket 102, a stator 104, a rotor 106, at least one rotor bearing assembly 108, and a cover 110.

The motor housing 100 may extend between the differential carrier 42 and the cover 110. The motor housing 100 may be mounted to the differential carrier 42 and the cover 110. For example, the motor housing 100 may extend from the mounting flange 60 of the differential carrier 42 to the cover 110. The motor housing 100 may extend around the axis 70 and may define a motor housing cavity 120. The motor housing cavity 120 may be disposed inside the motor housing 100 and may have a generally cylindrical configuration. The bearing support wall 62 of the differential carrier 42 may be located inside the motor housing cavity 120. Moreover, the motor housing 100 may extend continuously around and may be spaced apart from the bearing support wall 62. In at least one configuration, the motor housing 100 may have an exterior side 122, an interior side 124, a first end surface 126, a second end surface 128, and one or more ports 130.

The exterior side 122 may face away from the axis 70 and may define an exterior or outside surface of the motor housing 100.

The interior side 124 may be disposed opposite the exterior side 122. The interior side 124 may be disposed at a substantially constant radial distance from the axis 70 in one or more configurations.

The first end surface 126 may extend between the exterior side 122 and the interior side 124. The first end surface 126 may be disposed at an end of the motor housing 100 that may face toward the differential carrier 42. For instance, the first end surface 126 may be disposed adjacent to the mounting flange 60 of the differential carrier 42. The motor housing 100 and the first end surface 126 may or may not be received inside the mounting flange 60.

The second end surface 128 may be disposed opposite the first end surface 126. As such, the second end surface 128 may be disposed at an end of the motor housing 100 that may face toward and may engage the cover 110. The second end surface 128 may extend between the exterior side 122 and the interior side 124 and may or may not be received inside the cover 110.

One or more ports 130 may extend through the motor housing 100. The ports 130 may be configured as through holes that may extend from the exterior side 122 to the interior side 124. The ports 130 may allow coolant, such as a fluid like water, a water/antifreeze mixture, or the like, to flow to and from the coolant jacket 102 as will be described in more detail below.

Referring to FIG. 2, the coolant jacket 102 may help cool or remove heat from the stator 104. The coolant jacket 102 may be received in the motor housing cavity 120 of the motor housing 100 and may engage the interior side 124 of the motor housing 100. The coolant jacket 102 may extend axially between the differential carrier 42 and the cover 110. For example, the coolant jacket 102 may extend axially from the differential carrier 42 to the cover 110. In addition, the coolant jacket 102 may extend around the axis 70 and the stator 104. As such, the stator 104 may be at least partially received in and may be encircled by the coolant jacket 102. Moreover, the coolant jacket 102 may extend in a radial direction from the stator 104 to the interior side 124 of the motor housing 100. In at least one configuration, the coolant jacket 102 may include a plurality of channels 140.

The channels 140 may extend around the axis 70 and may be disposed opposite the stator 104. The channels 140 may be configured with an open side that may face away from the axis 70 and toward the interior side 124 of the motor housing 100. Coolant may be provided to the coolant jacket 102 via a first port 130 and may exit the coolant jacket 102 via a second port 130. For instance, coolant may flow from the first port 130 into the channels 140, receive heat from the stator 104 as the coolant flows through the channels 140, and exit at the second port 130. One or more baffles may be provided with the coolant jacket 102 that may reverse or change the direction of coolant flow to help route coolant from the first port 130 to the second port 130.

The stator 104 may be received in the motor housing 100. For instance, the stator 104 may be received in the motor housing cavity 120. The stator 104 may be fixedly positioned with respect to the coolant jacket 102. For example, the stator 104 may extend around the axis 70 and may include stator windings that may be received inside and may be fixedly positioned with respect to the coolant jacket 102.

The rotor 106 may extend around and may be rotatable about the axis 70. The rotor 106 may be received inside the stator 104, the coolant jacket 102, and the motor housing cavity 120 of the motor housing 100. The rotor 106 may be rotatable about the axis 70 with respect to the differential carrier 42 and the stator 104. In addition, the rotor 106 may be spaced apart from the stator 104 but may be disposed in close proximity to the stator 104. The rotor 106 may include magnets or ferromagnetic material that may facilitate the generation of electrical current or may be induction-based. The rotor 106 may extend around and may be supported by the bearing support wall 62.

Figure 3:
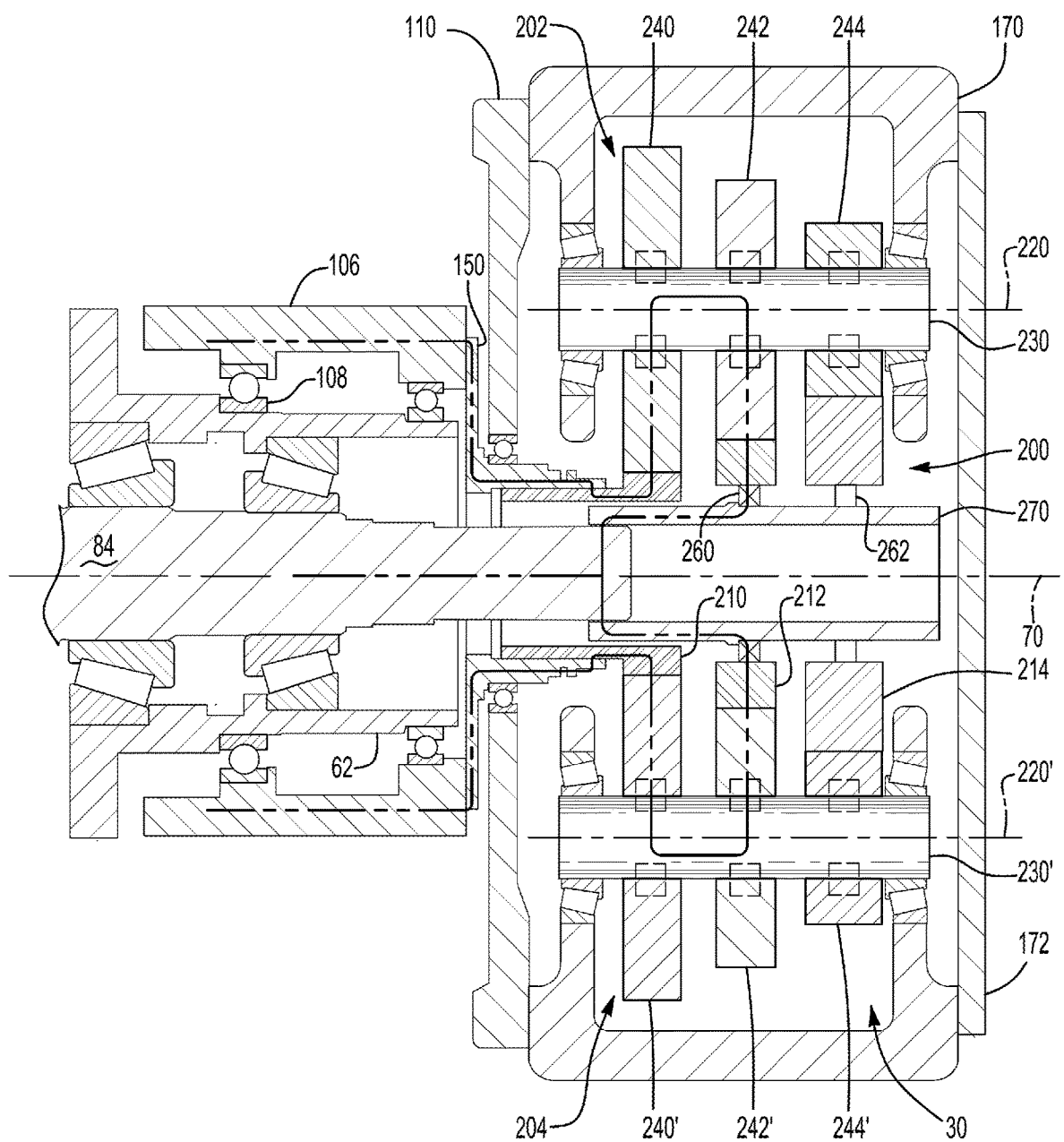
FIG. 3 is a magnified view of a portion of FIG. 2 showing a gear reduction unit and a torque path associated with a first gear ratio.

One or more rotor bearing assemblies 108 may rotatably support the rotor 106. For example, a rotor bearing assembly 108 may receive the bearing support wall 62 of the differential carrier 42 and may be received inside of the rotor 106. The rotor 106 may be operatively connected to the drive pinion 84. For instance, a coupling such as a rotor output flange 150 as is best shown in FIG. 3 may operatively connect the rotor 106 to the gear reduction module 30, which in turn may be operatively connectable with the drive pinion 84.

Referring to FIG. 2, the cover 110 may be mounted to the motor housing 100 and may be disposed opposite the axle housing 40 and the differential carrier 42. For example, the cover 110 may be mounted to an end or end surface of the motor housing 100, such as the second end surface 128, that may be disposed opposite the differential carrier 42. As such, the cover 110 may be spaced apart from and may not engage the differential carrier 42. The cover 110 may be provided in various configurations. In at least one configuration, the cover 110 may include a first side 160 and a second side 162. The first side 160 may face toward and may engage the motor housing 100. The second side 162 may be disposed opposite the first side 160. The second side 162 may face away from the motor housing 100 and may be disposed opposite the motor housing 100. The cover 110 may also include or define a motor cover opening that may be a through hole through which the drive pinion 84 may extend.

Gear Reduction Module and Clutches

Referring to FIG. 2, an example of a gear reduction module 30 is shown. The gear reduction module 30 may transmit torque between the electric motor module 26 and the differential assembly 22. As such, the gear reduction module 30 may operatively connect the electric motor module 26 and the differential assembly 22.

The gear reduction module 30 may be disposed outside of the differential carrier 42 and may be primarily disposed outside of the electric motor module 26 or entirely disposed outside the electric motor module 26, thereby providing a modular construction that may be mounted to the electric motor module 26 when gear reduction is desired. For instance, the gear reduction module 30 may include a gear reduction module housing 170 that may receive gears of the gear reduction module 30. The gear reduction module housing 170 may be provided in various configurations. For instance, the gear reduction module housing 170 may be a separate component that is mounted to the cover 110 or may be integrally formed with the cover 110. The gear reduction module housing 170 may extend from the second side 162 of the cover 110 in a direction that extends away from the electric motor module 26. A gear reduction module cover 172 may be disposed on the gear reduction module housing 170 and may be removable to provide access to components located inside the gear reduction module housing 170. It is also contemplated that the gear reduction module housing 170 and the gear reduction module cover 172 may be integrally formed.

The gear reduction module may be provided in various configurations and may include multiple gear sets that are operatively connected to each other. These gear sets may include a set of drive pinion gears and one or more countershaft gear sets that may have gears that may mesh with the set of drive pinion gears. For clarity, each gear set is designated with a different name below. The configurations discussed below will primarily be discussed in the context of a gear reduction module having two countershaft gear sets (i.e., first and second countershaft gear sets); however, it is to be understood that the second countershaft gear set may be omitted in these configurations.

Three main configurations of gear reduction modules 30, 30', 30" are described below and are best shown in FIGS. 3-10. It is to be understood that each gear reduction module configuration can be provided with an axle assembly having components as described above (e.g., with an axle assembly having a housing assembly 20, differential assembly 22, at least one axle shaft 24, electric motor module 26, drive pinion 84, a gear reduction module housing 170, etc.). Accordingly, magnified views are shown in FIGS. 3-10 to better depict each gear reduction module configuration rather than the remainder of the axle assembly. Each magnified view is a section view along the axis 70. In these figures, torque transmission paths between the electric motor module 26 and drive pinion 84 are represented by straight double-dash lines. In the configurations described below, torque transmission paths are primarily described in the context of transmitting torque from the electric motor module 26 to the drive pinion 84; however, the torque transmission paths may be bidirectional and may facilitate the transmission of torque from the drive pinion 84 to the electric motor module 26 under various operating conditions, such as during regenerative braking.

Figure 4:
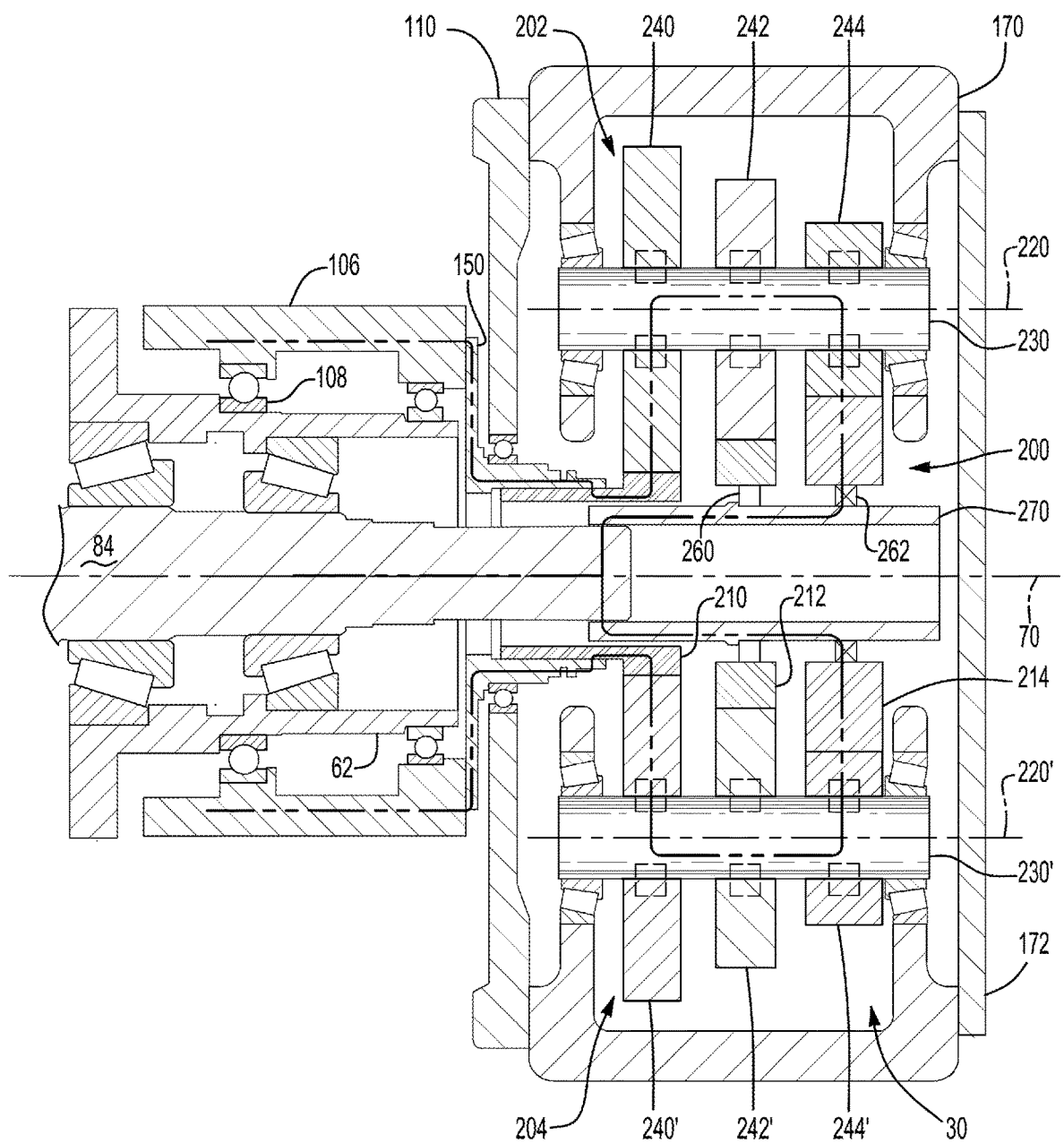
FIG. 4 shows the gear reduction unit of FIG. 2 and a torque path associated with a second gear ratio.

Referring to FIGS. 3 and 4, a first configuration of a gear reduction module 30 is shown. The gear reduction module 30 may include a set of drive pinion gears 200, a first countershaft gear set 202, and optionally a second countershaft gear set 204.

The set of drive pinion gears 200 may include a plurality of gears, some of which may be selectively coupled to the drive pinion 84. In the configuration shown, the set of drive pinion gears 200 includes a first gear 210, a second gear 212, and a third gear 214; however, it is to be understood that a greater or lesser number of gears may be provided.

The first gear 210 may extend around the axis 70. In at least one configuration, the first gear 210 may have a through hole that may receive the drive pinion 84, a connecting member 270, or both. The first gear 210 may have a plurality of teeth that may be arranged around and may extend away from the axis 70. The teeth of the first gear 210 may contact and may mate or mesh with teeth of a first countershaft gear that may be provided with the first countershaft gear set 202 and the second countershaft gear set 204 as will be discussed in more detail below. The first gear 210 may be operatively connected to the rotor 106 of the electric motor module 26 such that the rotor 106 and the first gear 210 are rotatable together about the axis 70. For example, the first gear 210 may be fixedly positioned with respect to the rotor 106 or fixedly coupled to the rotor 106 such that the first gear 210 is not rotatable about the axis 70 with respect to the rotor 106. It is contemplated that the first gear 210 may be fixedly mounted to or integrally formed with the rotor output flange 150. In addition, the first gear 210 may be continuously decoupled from the drive pinion 84 and may be rotatable with respect to the drive pinion 84. As such, a clutch may not connect the first gear 210 to the drive pinion 84 or a connecting member 270 that may extend from the drive pinion 84. The connecting member 270 may be received inside the first gear 210 and may be spaced apart from the first gear 210. In at least one configuration, the first gear 210 may be axially positioned along the axis 70 between the second gear 212 and the electric motor module 26.

The second gear 212 may extend around the axis 70. In at least one configuration, the second gear 212 may have a through hole that may receive the drive pinion 84, a connecting member 270, or both. The second gear 212 may have a plurality of teeth that may be arranged around and may extend away from the axis 70. The teeth of the second gear 212 may contact and may mate or mesh with teeth of a second countershaft gear that may be provided with the first countershaft gear set 202 and the second countershaft gear set 204 as will be discussed in more detail below. The second gear 212 may have a different diameter than the first gear 210 and the third gear 214. For example, the second gear 212 may have a larger diameter than the first gear 210 and a smaller diameter than the third gear 214. In at least one configuration, the second gear 212 may be axially positioned along the axis 70 between the first gear 210 and the third gear 214. The connecting member 270 may be received inside the second gear 212 and may be spaced apart from the second gear 212 in one or more configurations.

The third gear 214 may extend around the axis 70. In at least one configuration, the third gear 214 may have a through hole that may receive the drive pinion 84, a connecting member 270, or both. The third gear 214 may have a plurality of teeth that may be arranged around and may extend away from the axis 70. The teeth of the third gear 214 may contact and may mate or mesh with teeth of a third countershaft gear that may be provided with the first countershaft gear set 202 and the second countershaft gear set 204 as will be discussed in more detail below. The third gear 214 may have a different diameter than the first gear 210 and the second gear 212. For example, the third gear 214 may have a larger diameter than the first gear 210 and the second gear 212. In at least one configuration, the third gear 214 be axially positioned along the axis 70 further from the electric motor module 26 than the first gear 210 and the second gear 212. The connecting member 270 may be received inside the third gear 214 and may be spaced apart from the third gear 214 in one or more configurations.

Optionally, a bearing such as a roller bearing may rotatably support a corresponding drive pinion gear. For instance, the drive pinion 84 or connecting member 270 may be received inside a first bearing, a second bearing, and a third bearing. The first bearing may be received inside the first gear 210, the second bearing may be received inside the second gear 212, and so on to facilitate rotation of the drive pinion 84 with respect to a gear when the gear is not coupled to the drive pinion 84 or the connecting member 270.

The first countershaft gear set 202 may be in meshing engagement with the set of drive pinion gears 200. The first countershaft gear set 202 may be at least partially received in the gear reduction module housing 170. The first countershaft gear set 202 may be rotatable about a first countershaft axis 220. The first countershaft axis 220 may be disposed parallel or substantially parallel to the axis 70 in one or more embodiments. The first countershaft gear set 202 may include a first countershaft 230 and a plurality of gears. In the configuration shown, the plurality of gears of the first countershaft gear set 202 include a first countershaft gear 240, a second countershaft gear 242, and a third countershaft gear 244; however, it is contemplated that a greater number of countershaft gears or a lesser number of countershaft gears may be provided.

The first countershaft 230 may be rotatable about the first countershaft axis 220. For instance, the first countershaft 230 may be rotatably supported on the gear reduction module housing 170 by one or more roller bearing assemblies. As an example, a roller bearing assembly may be located near opposing first and second ends the first countershaft 230. The first countershaft 230 may support and be rotatable with the first countershaft gear 240, the second countershaft gear 242, and the third countershaft gear 244.

The first countershaft gear 240 may be fixedly disposed on the first countershaft 230 or fixedly mounted to the first countershaft 230. As such, the first countershaft gear 240 may rotate about the first countershaft axis 220 with the first countershaft 230 and may not be rotatable with respect to the first countershaft 230. For example, the first countershaft gear 240 may have a hole that may receive the first countershaft 230 and may be fixedly coupled to the first countershaft 230. The first countershaft gear 240 may extend around the first countershaft axis 220 and may have a plurality of teeth that may be arranged around and may extend away from the first countershaft axis 220. The teeth of the first countershaft gear 240 may contact and may mate or mesh with the teeth of the first gear 210. In at least one configuration, the first countershaft gear 240 may be axially positioned along the first countershaft axis 220 between the second countershaft gear 242 of the first countershaft gear set 202 and the electric motor module 26.

The second countershaft gear 242 may be fixedly disposed on the first countershaft 230 or fixedly mounted to the first countershaft 230. As such, the second countershaft gear 242 may rotate about the first countershaft axis 220 with the first countershaft 230 and may not be rotatable with respect to the first countershaft 230. For example, the second countershaft gear 242 may have a hole that may receive the first countershaft 230 and may be fixedly coupled to the first countershaft 230. The second countershaft gear 242 may extend around the first countershaft axis 220 and may have a plurality of teeth that may be arranged around and may extend away from the first countershaft axis 220. The teeth of the second countershaft gear 242 may contact and may mate or mesh with the teeth of the second gear 212. The second countershaft gear 242 may have a different diameter than the first countershaft gear 240 and the third countershaft gear 244. In at least one configuration, the second countershaft gear 242 may be axially positioned along the first countershaft axis 220 between the first countershaft gear 240 of the first countershaft gear set 202 and the third countershaft gear 244 of the first countershaft gear set 202.

The third countershaft gear 244 may be fixedly disposed on the first countershaft 230 or fixedly mounted to the first countershaft 230. As such, the third countershaft gear 244 may rotate about the first countershaft axis 220 with the first countershaft 230 and may not be rotatable with respect to the first countershaft 230. For example, the third countershaft gear 244 may have a hole that may receive the first countershaft 230 and may be fixedly coupled to the first countershaft 230. The third countershaft gear 244 may extend around the first countershaft axis 220 and may have a plurality of teeth that may be arranged around and may extend away from the first countershaft axis 220. The teeth of the third countershaft gear 244 may contact and may mate or mesh with the teeth of the third gear 214. The third countershaft gear 244 may have a different diameter than the first countershaft gear 240 and the second countershaft gear 242. In at least one configuration, the third countershaft gear 244 may be axially positioned along the first countershaft axis 220 further from the electric motor module 26 than the first countershaft gear 240 and the second countershaft gear 242 of the first countershaft gear set 202.

The second countershaft gear set 204 may be at least partially received in the gear reduction module housing 170 and may be rotatable about a second countershaft axis 220'. The second countershaft axis 220' may be disposed parallel or substantially parallel to the first countershaft axis 220 in one or more embodiments. The second countershaft gear set 204 may generally be disposed on an opposite side of the axis 70 from the first countershaft gear set 202 or may be disposed such that the first countershaft axis 220 and the second countershaft axis 220' may be disposed at a common radial distance from the axis 70. The first and second countershaft gear sets 202, 204 may be positioned at any suitable rotational angle or position about the axis 70.

The second countershaft gear set 204 may have the same or substantially the same configuration as the first countershaft gear set 202. For example, the second countershaft gear set 204 may include a second countershaft 230' that may be analogous to or may have the same structure as the first countershaft 230. In addition, the second countershaft gear set 204 may include a plurality of gears that are rotatable with the second countershaft 230'. In the configuration shown, the plurality of gears of the second countershaft gear set 204 include a first countershaft gear 240', a second countershaft gear 242', and a third countershaft gear 244'; however, it is contemplated that a greater number of gears or a lesser number of gears may be provided. The first countershaft gear 240', a second countershaft gear 242', and a third countershaft gear 244' of the second countershaft gear set 204 may be analogous to or may have the same structure as the first countershaft gear 240, a second countershaft gear 242, and a third countershaft gear 244, respectively, of the first countershaft gear set 202. The first countershaft gear 240', second countershaft gear 242', and third countershaft gear 244' may be arranged along and may be rotatable about a second countershaft axis 220' rather than the first countershaft axis 220 and may be fixed to the second countershaft 230' rather than the first countershaft 230.

The first gear 210 and the first countershaft gears 240, 240' may provide a different gear ratio than the second gear 212 and the second countershaft gears 242, 242' and may provide a different gear ratio than the third gear 214 and the third countershaft gears 244, 244'. As a non-limiting example, the first gear 210 and the first countershaft gears 240, 240' may provide a gear ratio of about 1.68:1, the second gear 212 and the second countershaft gears 242, 242' may provide a gear ratio of about 1:1, and the third gear 214 and the third countershaft gears 244, 244' may provide a gear ratio of 2:1. For instance, the first countershaft gears 240, 240' may have a larger diameter than the first gear 210, the second countershaft gears 242, 242', and the third countershaft gears 244, 244'. The second countershaft gears 242, 242' may have approximately the same diameter as the second gear 212. The third gear 214 may have a larger diameter than the third countershaft gears 244, 244'.

It is also contemplated that other gear configurations may be provided. As one example, the first gear 210 may have a larger diameter than the second gear 212 and the third gear 214. As another example, gears or gear pairings may be arranged in different sequences along their respective axes from the configuration shown. As another example, a gear pairing may provide an "overdrive" gear ratio of less than 1:1. As such, gear ratios may be provided that are greater than 1:1, less than 1:1, equal (i.e., 1:1), or combinations thereof.

The teeth of the drive pinion gears and the countershaft gears may be of any suitable type. As a non-limiting example, the meshing teeth of the members of the set of drive pinion gears 200, the gears of the first countershaft gear set 202, and the gears of the second countershaft gear set 204 may have a helical configuration.

In the configurations described below, one or more clutches may cooperate with the gear reduction module 30 to provide a desired gear reduction ratio and change the torque transmitted between the electric motor module 26 and the differential assembly 22, and hence between the electric motor module 26 and the axle shafts 24 of the axle assembly 10. A clutch may control rotation of one part with respect to another part. For instance, a clutch may connect and disconnect two parts, such as a driving part and a driven part. A clutch may have any suitable configuration. For instance, a clutch may be configured as a friction clutch, electromagnetic clutch, hydraulic clutch, or the like. A clutch may be configured as a slip clutch or a nonslip clutch. Slip clutches may be provided in various configurations, an example of which is a multi-plate clutch. Similarly nonslip clutches may also be provided in various configurations, such as a clutch collar, dog clutch, band clutch, or the like.

In the figures, a clutch is represented by a square box that extends between two components. The box is checked with an X when the clutch is engaged to couple, connect, or lock the two components to each other. The box is empty and is not checked with an X when the clutch is disengaged and the two components are decoupled, disconnected, or unlocked from each other. Two rotatable components may rotate together when a clutch connects those two components and may not rotate together when a clutch does not couple or connect those two rotatable components. A rotatable component may be inhibited from rotating when a clutch connects a rotatable component to a stationary or a non-rotatable component and may be rotatable with respect to the stationary or non-rotatable component when the clutch does not couple or connect those two components.

The square boxes may represent separate clutches or may represent clutches that may share a common component. For instance, a clutch that is configured as a shift collar may have teeth that may mesh with teeth of different components depending on the axial position of the shift collar. Thus, one square box may represent an approximate location where a shift collar may be coupled to or decoupled from a first component while a second square box may represent an approximate location where the shift collar may be coupled to or decoupled from a second component. For example, the connecting member 270 may be moveable along the axis 70 with respect to the drive pinion 84. A clutch may be operated or actuated with any suitable type of actuator in a manner known by those skilled in the art.

Referring to FIG. 3, two clutches are illustrated. These clutches may be referred to as a first clutch 260 and a second clutch 262.

The first clutch 260 may selectively couple the second gear 212 to the drive pinion 84. For instance, the first clutch 260 may connect the second gear 212 to the drive pinion 84 directly or via an intervening component like the connecting member 270 such that the second gear 212 and the drive pinion 84 may be rotatable together about the axis 70 when the first clutch 260 is engaged. Conversely, the first clutch 260 may be disengaged to permit relative rotation between the second gear 212 and the drive pinion 84. The first clutch 260 is illustrated as extending between the second gear 212 and the connecting member 270; however, other configurations and positioning are contemplated. For instance, the connecting member 270 may be omitted and the first clutch 260 may extend from the drive pinion 84.

The second clutch 262 may selectively couple the third gear 214 to the drive pinion 84. For instance, the second clutch 262 may connect the third gear 214 to the drive pinion 84 directly or via an intervening component, such as the connecting member 270 such that the third gear 214 and the drive pinion 84 may be rotatable together about the axis 70 when the second clutch 262 is engaged. Conversely, the second clutch 262 may be disengaged to permit relative rotation between the third gear 214 and the drive pinion 84. The second clutch 262 is illustrated as extending between the third gear 214 and the connecting member 270; however, other configurations and positioning are contemplated. For instance, the connecting member 270 may be omitted and the second clutch 262 may extend from the drive pinion 84.

Referring to FIG. 3, clutching for providing a first gear ratio is illustrated. In at least one configuration, the first gear ratio may be a high-speed gear ratio. The first clutch 260 is engaged and the second clutch 262 is disengaged. Torque may be transmitted from the rotor 106 to the first gear 210 such as via the rotor output flange 150, from the first gear 210 to the first countershaft gears 240, 240', from the first countershaft gears 240, 240' to the second countershaft gears 242, 242' via the first and second countershafts 230, 230', respectively, from the second countershaft gears 242, 242' to the second gear 212, and from the second gear 212 to the drive pinion 84 via the first clutch 260 and the connecting member 270, if provided. As such, the first gear 210 and the third gear 214 may be rotatable about the axis 70 with respect to the drive pinion 84 when the first gear ratio is provided.

Referring to FIG. 4, clutching for providing a second gear ratio is illustrated. In at least one configuration, the second gear ratio may be a low-speed gear ratio. The first clutch 260 is disengaged and the second clutch 262 is engaged. Torque may be transmitted from the rotor 106 to the first gear 210 such as via the rotor output flange 150, from the first gear 210 to the first countershaft gears 240, 240', from the first countershaft gears 240, 240' to the third countershaft gears 244, 244' via the first and second countershafts 230, 230', respectively, from the third countershaft gears 244, 244' to the third gear 214, and from the third gear 214 to the drive pinion 84 via the second clutch 262 and the connecting member 270, if provided. As such, the first gear 210 and the second gear 212 may be rotatable about the axis 70 with respect to the drive pinion 84 when the second gear ratio is provided.

Figure 5:
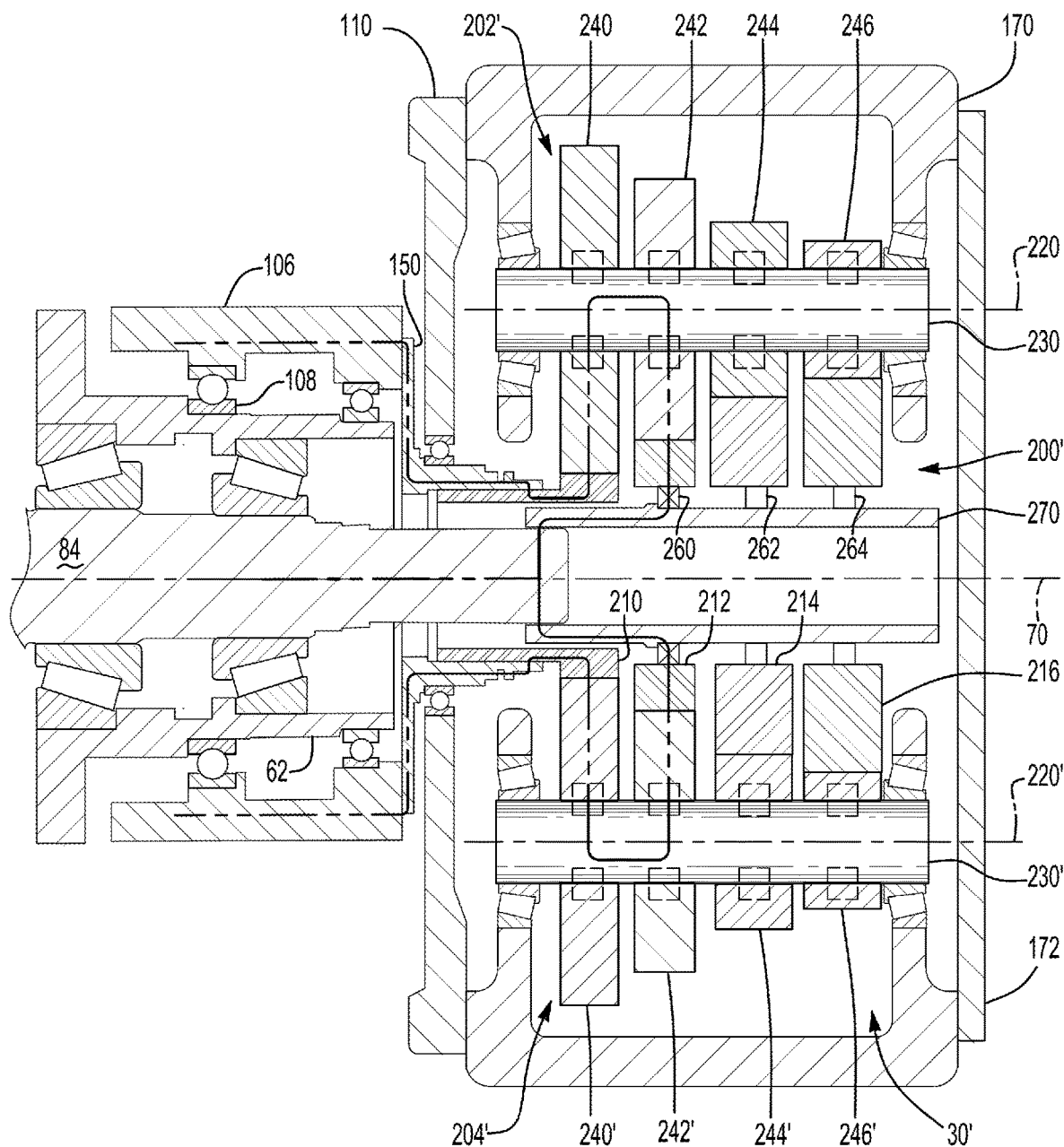
FIG. 5 is a magnified view that shows a second configuration of a gear reduction unit and a torque path associated with a first gear ratio.
Figure 6:
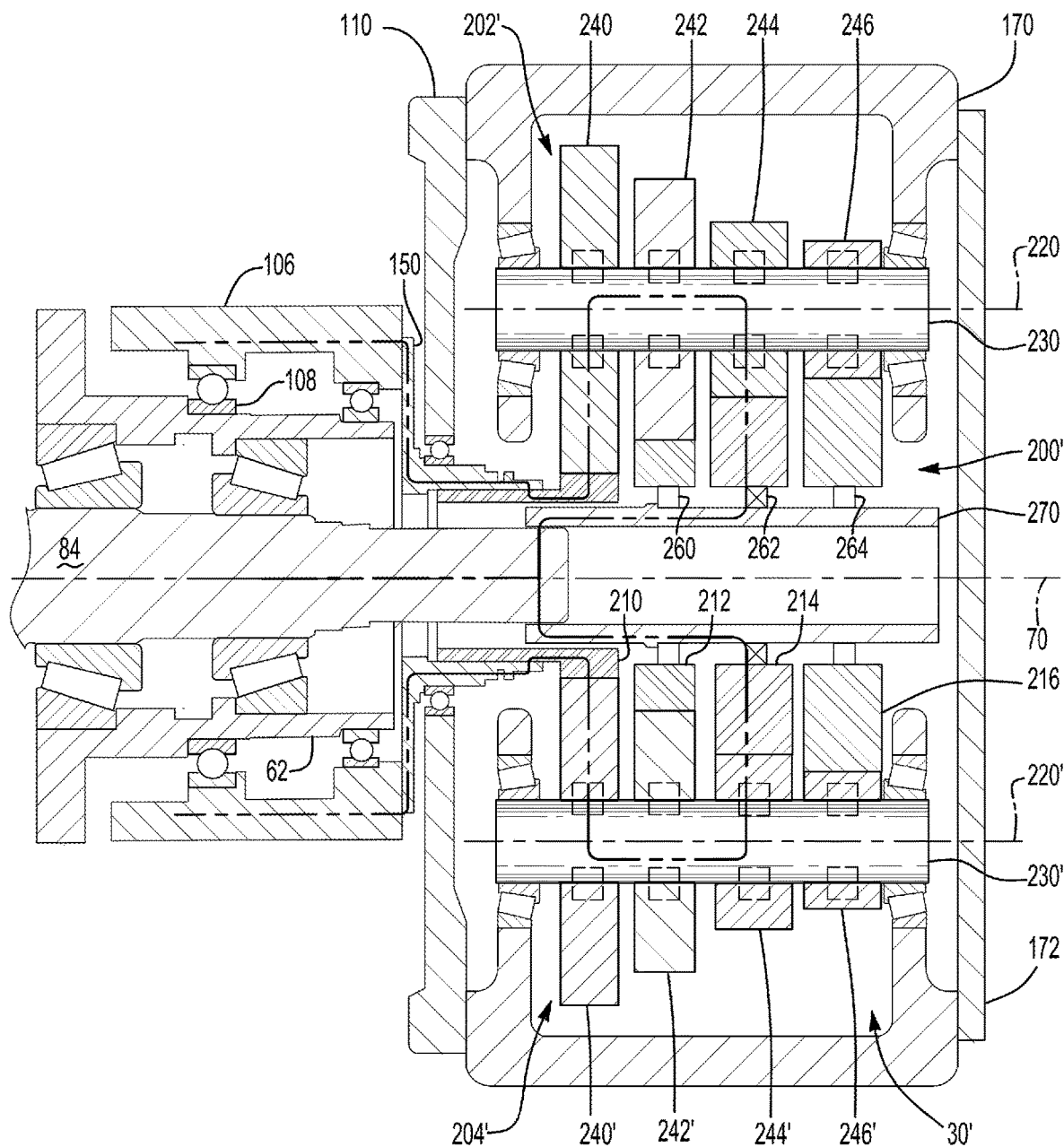
FIG. 6 shows the gear reduction unit of FIG. 5 and a torque path associated with a second gear ratio.
Figure 7:
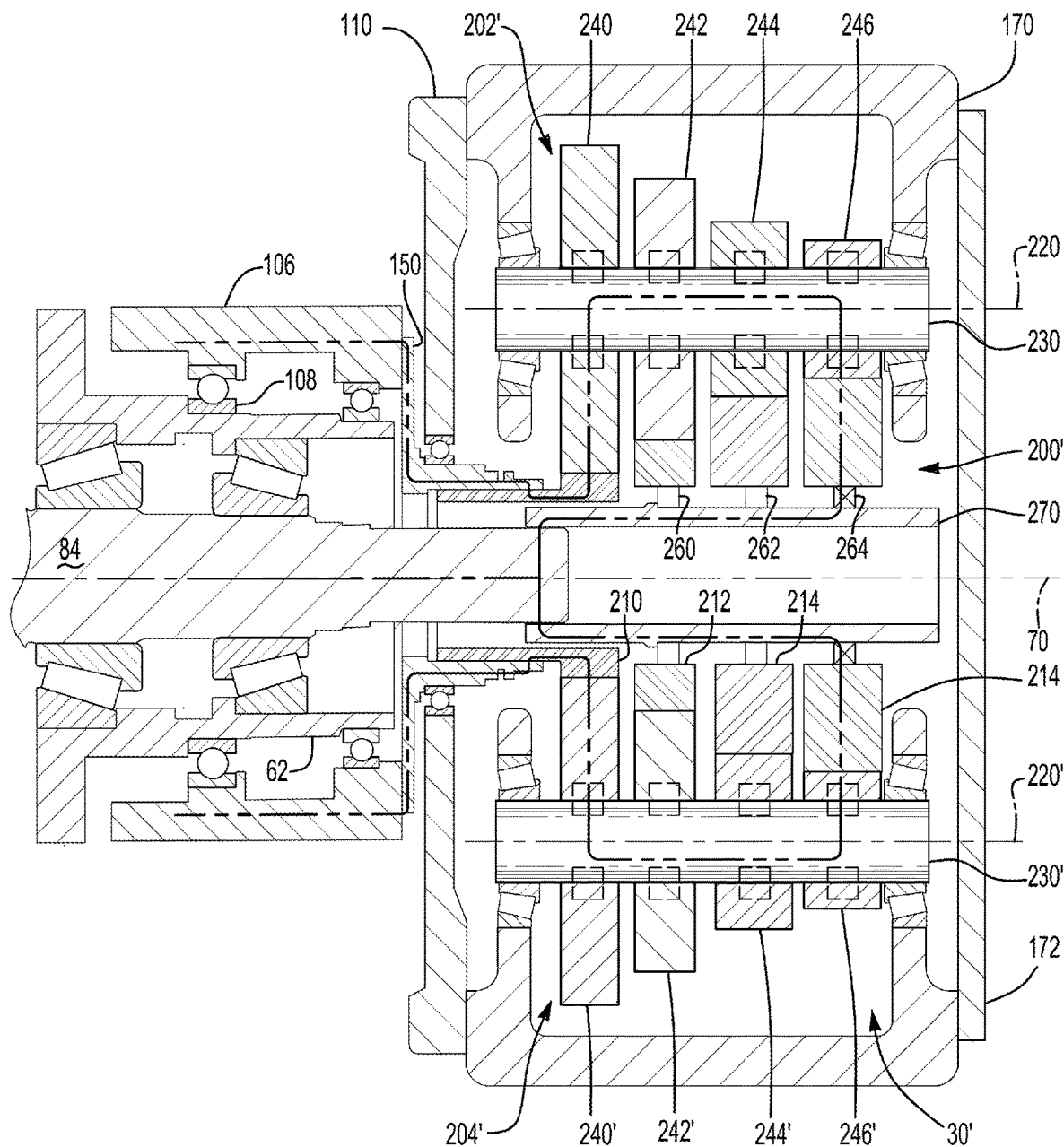
FIG. 7 shows the gear reduction unit of FIG. 5 and a torque path associated with a third gear ratio.

Referring to FIGS. 5-7, a second configuration of a gear reduction module 30' is shown. In this configuration, the gear reduction module 30' may include a set of drive pinion gears 200', a first countershaft gear set 202', and a second countershaft gear set 204'.

The set of drive pinion gears 200' may include a first gear 210, a second gear 212, and a third gear 214 as previously described. In addition, the set of drive pinion gears 200' may include one or more additional drive pinion gears, such as a fourth gear 216.

The fourth gear 216 may extend around the axis 70. In at least one configuration, the fourth gear 216 may have a through hole that may receive the drive pinion 84, the connecting member 270, or both. The fourth gear 216 may have a plurality of teeth that may be arranged around and may extend away from the axis 70. The teeth of the fourth gear 216 may contact and may mate or mesh with teeth of a fourth countershaft gear that may be provided with the first countershaft gear set 202' and the second countershaft gear set 204' as will be discussed in more detail below. The fourth gear 216 may have a different diameter than the first gear 210, the second gear 212, the third gear 214, or combinations thereof. For example, the fourth gear 216 may have a larger diameter than the first gear 210, the second gear 212, and the third gear 214. In at least one configuration, the fourth gear 216 may be axially positioned along the axis 70 further from the electric motor module 26 than the third gear 214.

The first countershaft gear set 202' may include a first countershaft gear 240, a second countershaft gear 242, and a third countershaft gear 244 as previously described. In addition, the first countershaft gear set 202' may include one or more additional countershaft gears, such as a fourth countershaft gear 246.

The fourth countershaft gear 246 may be fixedly disposed on the first countershaft 230 or fixedly mounted to the first countershaft 230. As such, the fourth countershaft gear 246 may rotate about the first countershaft axis 220 with the first countershaft 230 and may not be rotatable with respect to the first countershaft 230. For example, the fourth countershaft gear 246 may have a hole that may receive the first countershaft 230 and may be fixedly coupled to the first countershaft 230. The fourth countershaft gear 246 may extend around the first countershaft axis 220 and may have a plurality of teeth that may be arranged around and may extend away from the first countershaft axis 220. The teeth of the fourth countershaft gear 246 may contact and may mate or mesh with the teeth of the fourth gear 216. The fourth countershaft gear 246 may have a different diameter than the first countershaft gear 240, the second countershaft gear 242, the third countershaft gear 244, or combinations thereof. In at least one configuration, the fourth countershaft gear 246 may be axially positioned along the first countershaft axis 220 further from the electric motor module 26 than the third countershaft gear 244 of the first countershaft gear set 202'.

The second countershaft gear set 204' may include a first countershaft gear 240', a second countershaft gear 242', and a third countershaft gear 244' as previously described. In addition, the second countershaft gear set 204' may include one or more additional countershaft gears, such as a fourth countershaft gear 246'.

The fourth countershaft gear 246' may be fixedly disposed on the second countershaft 230' or fixedly mounted to the second countershaft 230'. As such, the fourth countershaft gear 246' may rotate about the second countershaft axis 220' with the second countershaft 230' and may not be rotatable with respect to the second countershaft 230'. For example, the fourth countershaft gear 246' may have a hole that may receive the second countershaft 230' and may be fixedly coupled to the second countershaft 230'. The fourth countershaft gear 246' may extend around the second countershaft axis 220' and may have a plurality of teeth that may be arranged around and may extend away from the second countershaft axis 220'. The teeth of the fourth countershaft gear 246' may contact and may mate or mesh with the teeth of the fourth gear 216. The fourth countershaft gear 246' may have a different diameter than the first countershaft gear 240', the second countershaft gear 242', the third countershaft gear 244', or combinations thereof. In at least one configuration, the fourth countershaft gear 246' may be axially positioned along the second countershaft axis 220' further from the electric motor module 26 than the third countershaft gear 244' of the second countershaft gear set 204'.

Referring to FIG. 5, three clutches are illustrated. These clutches may be referred to as a first clutch 260, a second clutch 262, and a third clutch 264.

The first clutch 260 and the second clutch 262 may be the same as previously described.

Figure 11:
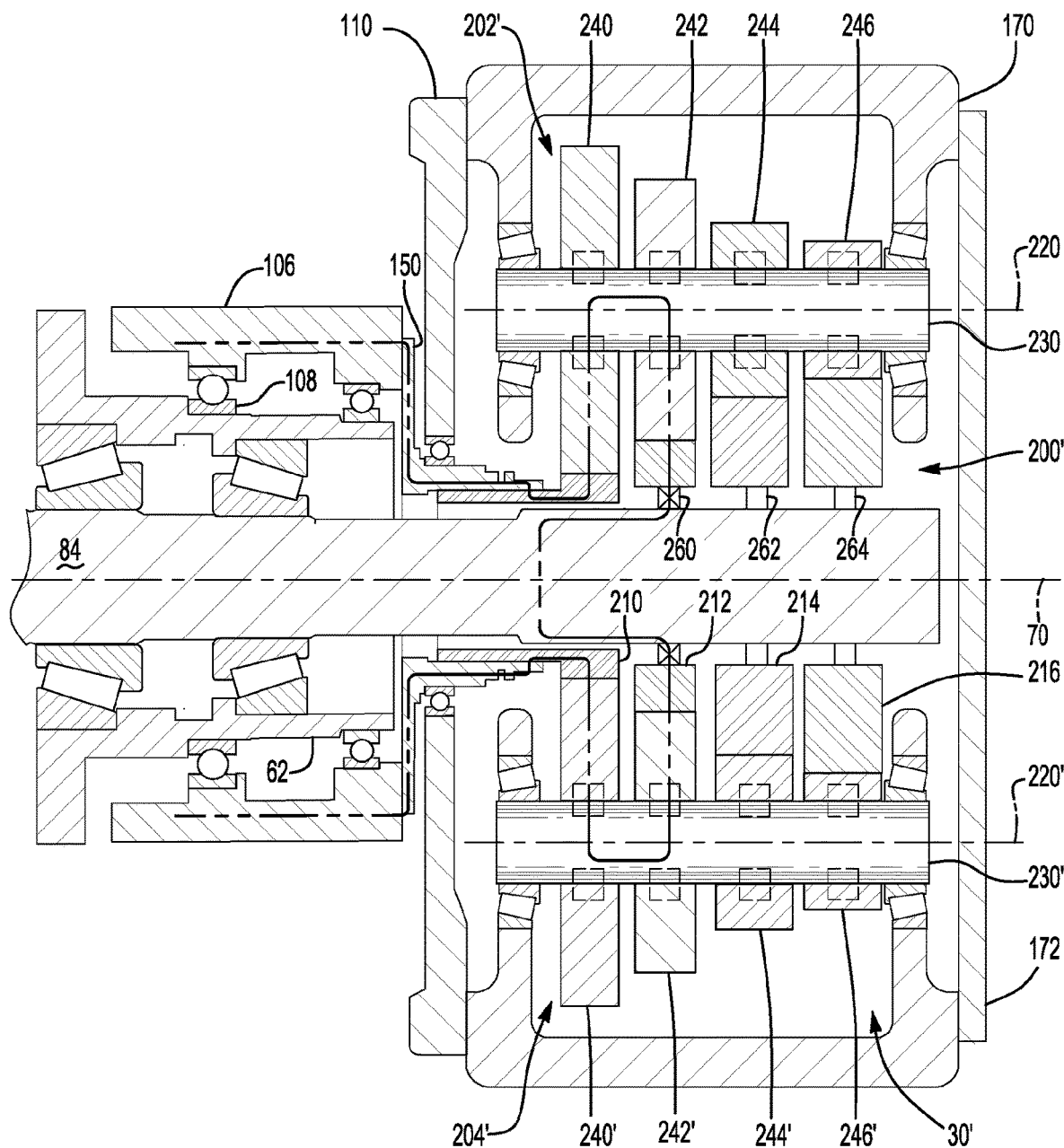
FIG. 11 is a magnified view based on FIG. 5 without a connecting member.

The third clutch 264 may selectively couple the fourth gear 216 to the drive pinion 84. For instance, the third clutch 264 may connect the fourth gear 216 to the drive pinion 84 directly or via an intervening component, such as the connecting member 270 such that the fourth gear 216 and the drive pinion 84 may be rotatable together about the axis 70 when the third clutch 264 is engaged. FIG. 11 shows an example in which the connecting member is omitted and in which a clutch may connect a gear directly to the drive pinion 84. Conversely, the third clutch 264 may be disengaged to permit relative rotation between the fourth gear 216 and the drive pinion 84. The third clutch 264 is illustrated as extending between the fourth gear 216 and the connecting member 270; however, other configurations and positioning are contemplated. For instance, the connecting member 270 may be omitted and the third clutch 264 may extend from the drive pinion 84.

Referring to FIG. 5, clutching for providing a first gear ratio is illustrated. In at least one configuration, the first gear ratio may be a high-speed gear ratio. The first clutch 260 is engaged and the second clutch 262 and the third clutch 264 are disengaged. Torque may be transmitted from the rotor 106 to the first gear 210 such as via the rotor output flange 150, from the first gear 210 to the first countershaft gears 240, 240', from the first countershaft gears 240, 240' to the second countershaft gears 242, 242' via the first and second countershafts 230, 230', respectively, from the second countershaft gears 242, 242' to the second gear 212, and from the second gear 212 to the drive pinion 84 via the first clutch 260 and the connecting member 270, if provided. As such, the first gear 210, the third gear 214, and the fourth gear 216 may be rotatable about the axis 70 with respect to the drive pinion 84 when the first gear ratio is provided.

Referring to FIG. 6, clutching for providing a second gear ratio is illustrated. In at least one configuration, the second gear ratio may be an intermediate or mid-speed gear ratio that may differ from the first gear ratio. The second clutch 262 is engaged and the first clutch 260 and the third clutch 264 are disengaged. Torque may be transmitted from the rotor 106 to the first gear 210 such as via the rotor output flange 150, from the first gear 210 to the first countershaft gears 240, 240', from the first countershaft gears 240, 240' to the third countershaft gears 244, 244' via the first and second countershafts 230, 230', respectively, from the third countershaft gears 244, 244' to the third gear 214, and from the third gear 214 to the drive pinion 84 via the second clutch 262 and the connecting member 270, if provided. As such, the first gear 210, the second gear 212, and the fourth gear 216 may be rotatable about the axis 70 with respect to the drive pinion 84 when the second gear ratio is provided.

Referring to FIG. 7, clutching for providing a third gear ratio is illustrated. In at least one configuration, the third gear ratio may be a low-speed gear ratio that may differ from the first gear ratio and the second gear ratio. The third clutch 264 is engaged and the first clutch 260 and the second clutch 262 are disengaged. Torque may be transmitted from the rotor 106 to the first gear 210 such as via the rotor output flange 150, from the first gear 210 to the first countershaft gears 240, 240', from the first countershaft gears 240, 240' to the fourth countershaft gears 246, 246' via the first and second countershafts 230, 230', respectively, from the fourth countershaft gears 246, 246' to the fourth gear 216, and from the fourth gear 216 to the drive pinion 84 via the third clutch 264 and the connecting member 270, if provided. As such, the first gear 210, the second gear 212, and the third gear 214 may be rotatable about the axis 70 with respect to the drive pinion 84 when the third gear ratio is provided.

Figure 8:
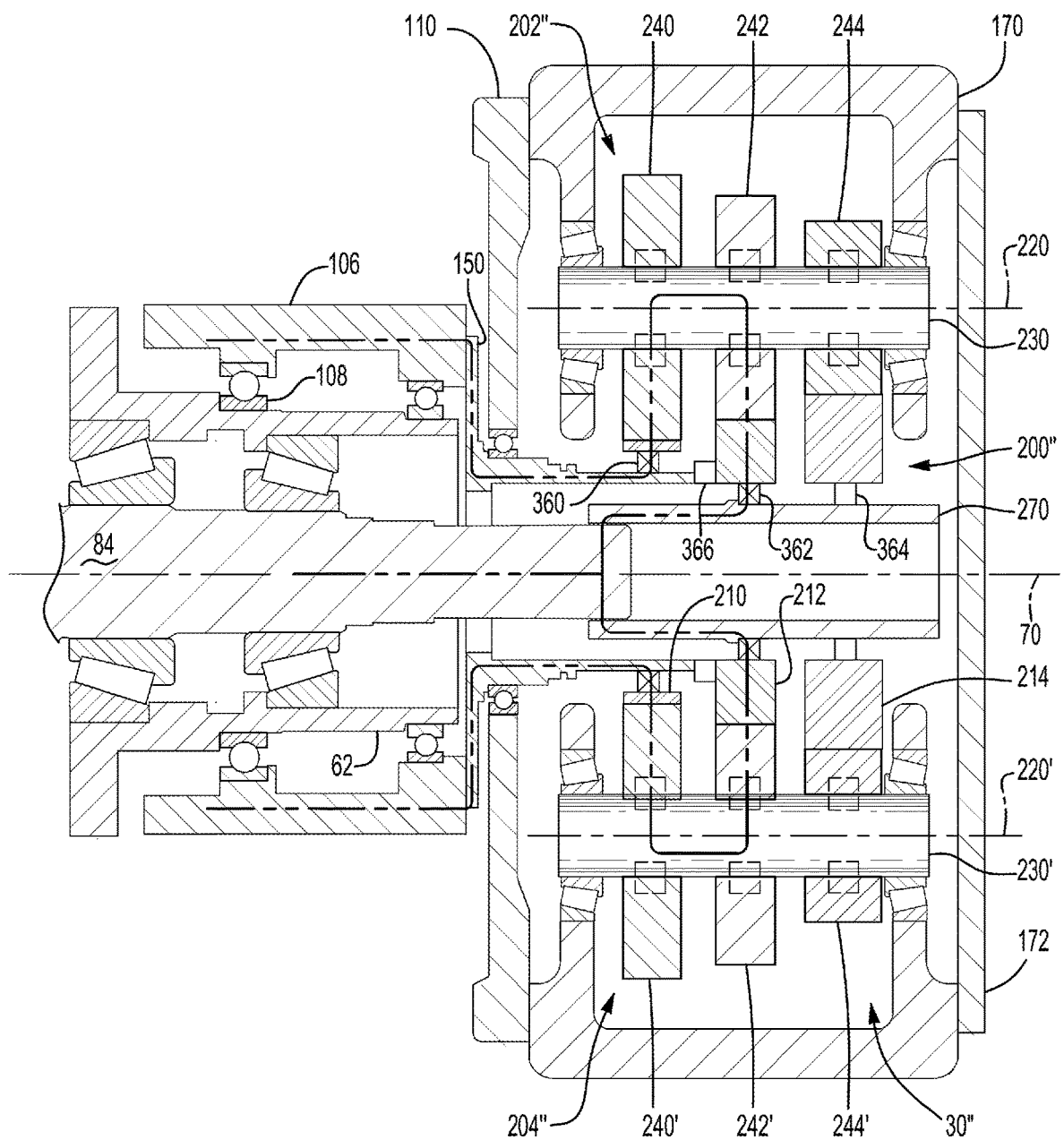
FIG. 8 is a magnified view that shows a third configuration of a gear reduction unit and a torque path associated with a first gear ratio.
Figure 9:
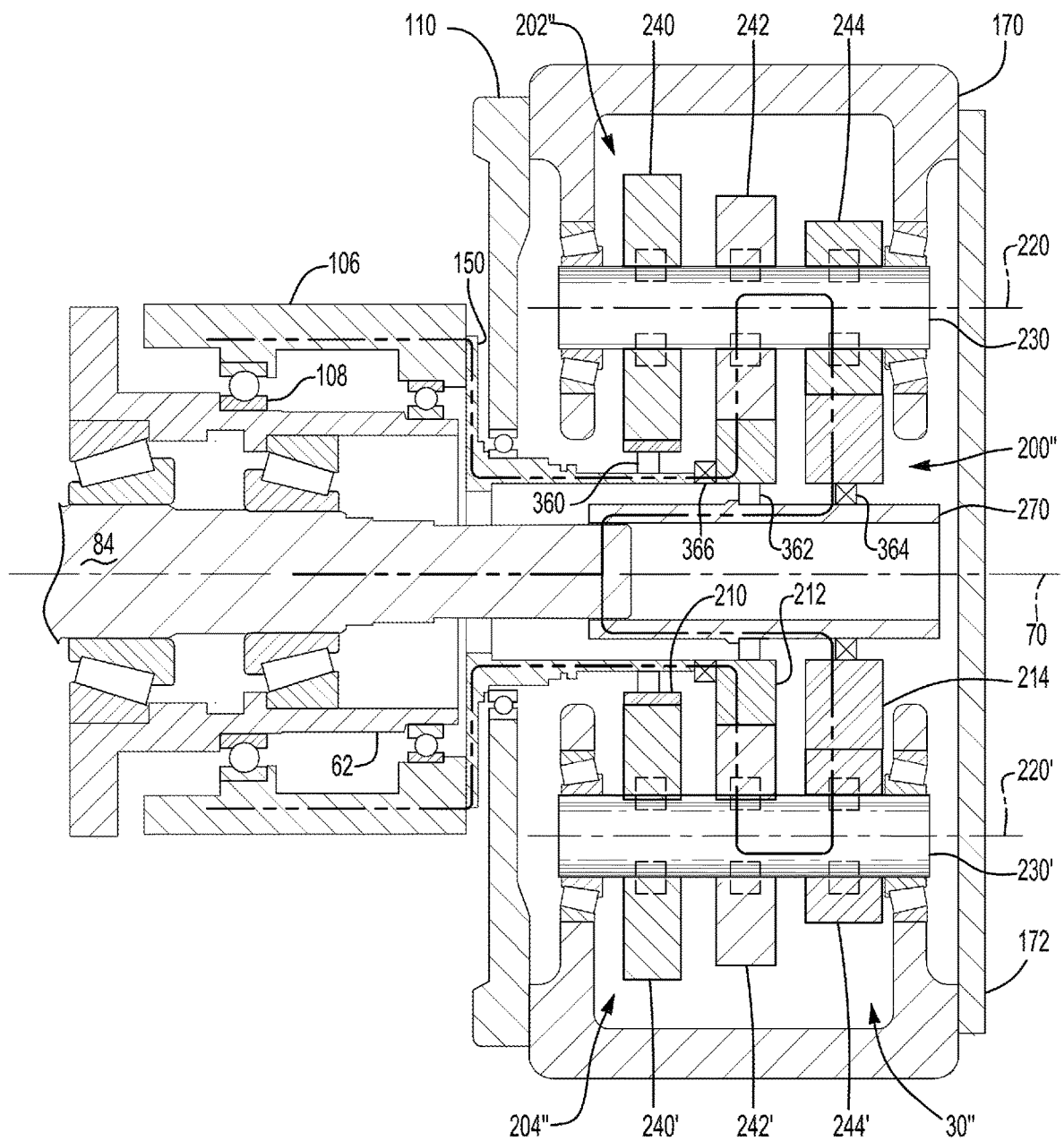
FIG. 9 shows the gear reduction unit of FIG. 8 and a torque path associated with a second gear ratio.
Figure 10:
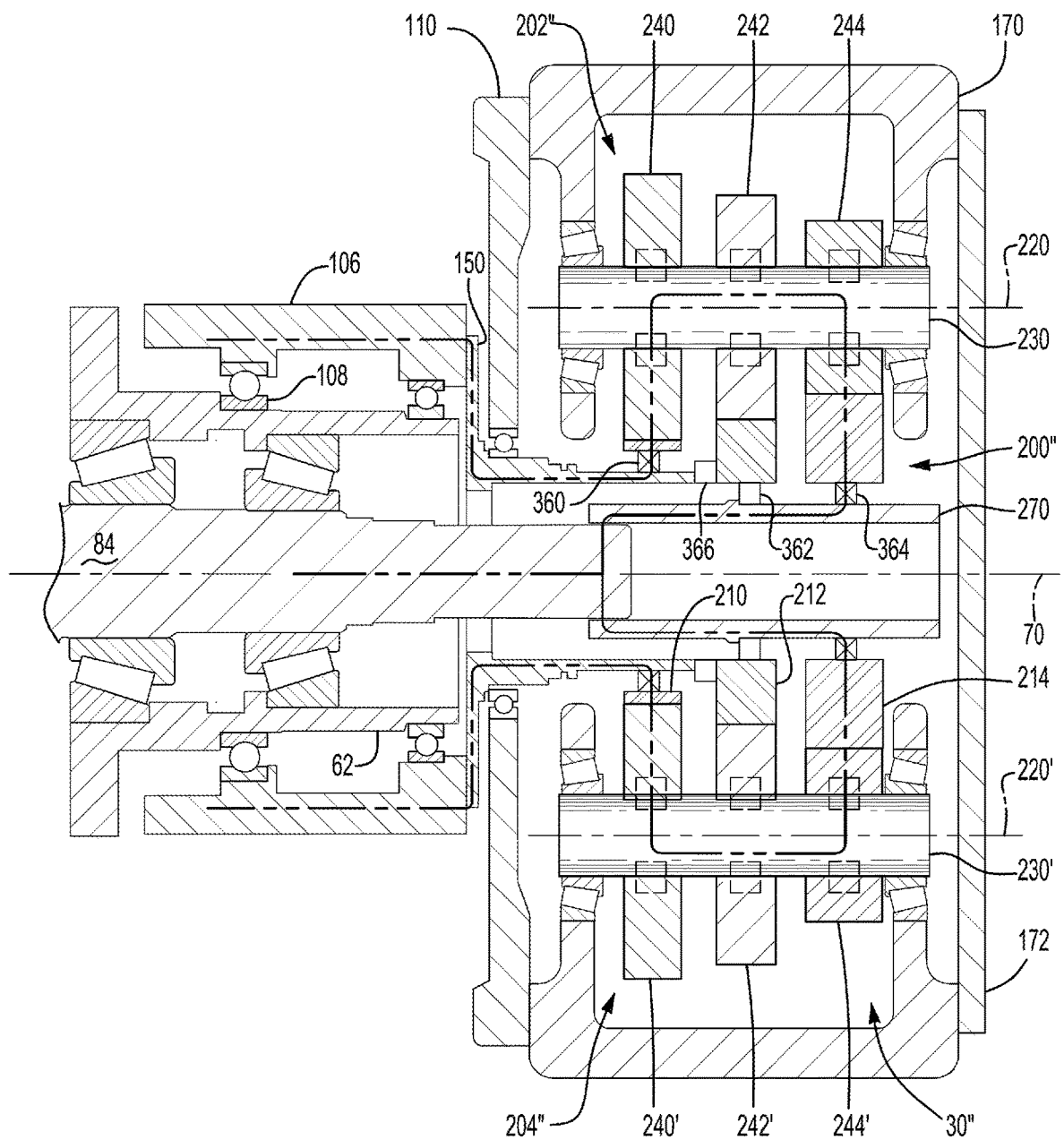
FIG. 10 shows the gear reduction unit of FIG. 8 and a torque path associated with a third gear ratio.

Referring to FIGS. 8-10, a third configuration of a gear reduction module 30" is shown. In this configuration, the gear reduction module 30" may include a set of drive pinion gears 200", a first countershaft gear set 202", and a second countershaft gear set 204".

The set of drive pinion gears 200" may include a first gear 210, a second gear 212, and a third gear 214 as previously described. However, the first gear 210 may be selectively connectable to the rotor 106 rather than fixedly coupled to the rotor 106. As previously described, the first gear 210 may mate or mesh with the first countershaft gears 240, 240', may be decoupled from the drive pinion 84, and may be rotatable with respect to the drive pinion 84.

The first countershaft gear set 202" may include a first countershaft gear 240, a second countershaft gear 242, and a third countershaft gear 244 that are fixedly disposed on the first countershaft 230 as previously described.

The second countershaft gear set 204" may include a first countershaft gear 240', a second countershaft gear 242', and a third countershaft gear 244' that are fixedly disposed on the second countershaft 230' as previously described.

Referring to FIG. 8, four clutches are illustrated. These clutches may be referred to as a first clutch 360, a second clutch 362, a third clutch 364, and a fourth clutch 366.

The first clutch 360 may selectively connect the first gear 210 to the rotor 106. For instance, the first clutch 360 may connect the first gear 210 to the rotor 106 directly or via an intervening component like the rotor output flange 150 such that the first gear 210 and the rotor 106 may be rotatable together about the axis 70 when the first clutch 360 is engaged. Conversely, the first clutch 360 may be disengaged to permit relative rotation between the first gear 210 and the rotor 106 and the rotor output flange 150, if provided. In the configuration shown, the first clutch 360 is illustrated as extending between the rotor output flange 150 and the first gear 210.

The second clutch 362 may be analogous to the first clutch 260 associated with the configuration shown in FIGS. 3 and 4. As such, the second clutch 362 may selectively connect the second gear 212 to the drive pinion 84, either directly or via an intervening component, such as the connecting member 270. The second gear 212 and the drive pinion 84 may be rotatable together about the axis 70 when the second clutch 362 is engaged. Conversely, the second clutch 362 may be disengaged to permit relative rotation between the second gear 212 and the drive pinion 84.

The third clutch 364 may be analogous to the second clutch 262 associated with the configuration shown in FIGS. 3 and 4. As such, the third clutch 364 may selectively connect the third gear 214 to the drive pinion 84, either directly or via an intervening component, such as the connecting member 270. The third gear 214 and the drive pinion 84 may be rotatable together about the axis 70 when the third clutch 364 is engaged. Conversely, the third clutch 364 may be disengaged to permit relative rotation between the third gear 214 and the drive pinion 84.

The fourth clutch 366 may selectively connect the rotor 106 to the second gear 212. For instance, the fourth clutch 366 may connect the second gear 212 to the rotor 106 directly or via an intervening component, such as the rotor output flange 150 such that the rotor 106 and the second gear 212 may be rotatable together about the axis 70 when the fourth clutch 366 is engaged. Conversely, the fourth clutch 366 may be disengaged to permit relative rotation between the second gear 212 and the rotor 106. In the configuration shown, the fourth clutch 366 is illustrated as extending between the second gear 212 and the rotor output flange 150.

Referring to FIG. 8, clutching for providing a first gear ratio is illustrated. In at least one configuration, the first gear ratio may be a high-speed gear ratio. The first clutch 360 and the second clutch 362 are engaged and the third clutch 364 and the fourth clutch 366 are disengaged. Torque may be transmitted from the rotor 106 to the first gear 210 such as via the rotor output flange 150 and the first clutch 360, from the first gear 210 to the first countershaft gears 240, 240', from the first countershaft gears 240, 240' to the second countershaft gears 242, 242' via the first and second countershafts 230, 230', respectively, from the second countershaft gears 242, 242' to the second gear 212, and from the second gear 212 to the drive pinion 84 via the second clutch 362 and the connecting member 270, if provided. As such, the first gear 210 may be rotatable with respect to the second gear 212, and the first gear 210 and the third gear 214 may be rotatable about the axis 70 with respect to the drive pinion 84 when the first gear ratio is provided.

Referring to FIG. 9, clutching for providing a second gear ratio is illustrated. In at least one configuration, the second gear ratio may be an intermediate or mid-speed gear ratio that may differ from the first gear ratio. The third clutch 364 and the fourth clutch 366 are engaged and the first clutch 360 and the second clutch 362 are disengaged. Torque may be transmitted from the rotor 106 to the second gear 212 such as via the rotor output flange 150 and the fourth clutch 366, from the second gear 212 to the second countershaft gears 242, 242', from the second countershaft gears 242, 242' to the third countershaft gears 244, 244' via the first and second countershafts 230, 230', respectively, from the third countershaft gears 244, 244' to the third gear 214, and from the third gear 214 to the drive pinion 84 via the third clutch 364 and the connecting member 270, if provided. As such, the rotor 106 and the second gear 212 may rotate together about the axis 70, the first gear 210 may not drive the first countershaft gears 240, 240', and the first gear 210 and the second gear 212 may be rotatable about the axis 70 with respect to the drive pinion 84 when the second gear ratio is provided.

Referring to FIG. 10, clutching for providing a third gear ratio is illustrated. In at least one configuration, the third gear ratio may be a low-speed gear ratio that may differ from the first gear ratio and the second gear ratio. The first clutch 360 and the third clutch 364 are engaged and the second clutch 362 and the fourth clutch 366 are disengaged. Torque may be transmitted from the rotor 106 to the first gear 210 such as via the rotor output flange 150 and the first clutch 360, from the first gear 210 to the first countershaft gears 240, 240', from the first countershaft gears 240, 240' to the third countershaft gears 244, 244' via the first and second countershafts 230, 230', respectively, from the third countershaft gears 244, 244' to the third gear 214, and from the third gear 214 to the drive pinion 84 via the third clutch 364 and the connecting member 270, if provided. As such, the first gear 210 and the second gear 212 may be rotatable about the axis 70 with respect to each other and with respect to the drive pinion 84 when the third gear ratio is provided.

Referring to FIG. 1, the axle assembly 10 may optionally include an isolator support 400. The isolator support 400 may help support the end of the axle assembly 10 that is disposed furthest from the axle housing 40 and the differential axis 80. In at least one configuration, the isolator support 400 may extend from the gear reduction module housing 170 or the gear reduction module cover 172 to a cross beam 402 that may be part of the chassis of the vehicle. For instance, the cross beam 402 may extend in a lateral direction between two frame rails of the vehicle. The isolator support 400 may include a first portion 404 that may be mounted on the gear reduction module housing 170 or the gear reduction module cover 172 and a second portion 406 that may be mounted to the cross beam 402. The isolator support 400 may allow the first portion 404 to pivot about an isolator mount axis 408 with respect to the second portion 406 and may help limit movement and acceleration of the gear reduction module housing 170. For example, it is contemplated that a portion of the isolator support 400 may include a resilient member that may be received in a hole in the first portion 404, the second portion 406 or both. It is also contemplated that the first portion 404 or the second portion 406 may be configured as a shock absorber. The isolator support 400 may be provided with any of the configurations previously discussed.

An axle assembly having gear set configurations as described above may provide multiple gear ratios or multiple speeds while providing a more compact package space. Moreover the gear set configurations may allow the difference between gear ratios to be reduced as compared to a two-speed single planetary gear configuration, which may help improve efficiency of the gear reduction unit and drivability of the vehicle. In addition, the configurations described above may allow each gear ratio to be a gear reduction with respect to the rotor speed, which may help reduce the rotational speed of the gear sets and helping reduce heating of the roller bearing assemblies associated with the gear sets and improve bearing life.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an electric motor having a rotor that is rotatable about an axis;
   a drive pinion that extends through the rotor and is rotatable about the axis;
   a gear reduction unit that includes:
      a first countershaft gear set that includes first, second, and third countershaft gears that are fixedly mounted to a first countershaft such that the first, second, and third countershaft gears are rotatable about a first countershaft axis with the first countershaft;
      a second countershaft gear set that includes first, second, and third countershaft gears that are fixedly mounted to a second countershaft such that the first, second, and third countershaft gears of the second countershaft gear set are rotatable about a second countershaft axis with the second countershaft; and
      a set of drive pinion gears that include first, second, and third gears that are rotatable about the axis and that mesh with the first, second, and third countershaft gears of the first countershaft gear set, respectively, and that mesh with first, second, and third countershaft gears of the second countershaft gear set, respectively, wherein the first gear is continuously connected to the rotor and decoupled from and rotatable with respect to the drive pinion, and the second and third gears are operatively connectable to the drive pinion;
   a first clutch that selectively connects the second gear and the drive pinion; and
   a second clutch that selectively connects the third gear and the drive pinion.

2. The axle assembly of claim 1 wherein the first clutch selectively connects the second gear and the drive pinion via a connecting member that extends from the drive pinion and is rotatable about the axis with the drive pinion.

3. The axle assembly of claim 2 wherein the second clutch selectively connects the third gear and the drive pinion via the connecting member.

4. The axle assembly of claim 2 wherein the connecting member is received inside the first gear and is spaced apart from the first gear.

5. The axle assembly of claim 2 wherein the first gear is not directly clutchable to the drive pinion or to the connecting member.

6. The axle assembly of claim 1, wherein the first clutch directly connects the second gear to the drive pinion.

7. The axle assembly of claim 1 wherein the drive pinion is not received inside the first gear, the second gear, or the third gear.

8. The axle assembly of claim 1 wherein the first clutch does not connect the second gear and the drive pinion when the second clutch connects the third gear to the drive pinion and the second clutch does not connect the third gear to the drive pinion when the first clutch connects the second gear to the drive pinion.

9. The axle assembly of claim 1 wherein torque is transmitted between the electric motor and the drive pinion at a first gear ratio when the first clutch connects the second gear and the drive pinion and the second clutch does not connect the third gear and the drive pinion.

10. The axle assembly of claim 1 wherein torque is transmitted between the electric motor and the drive pinion at a second gear ratio when the second clutch connects the third gear and the drive pinion and the first clutch does not connect the second gear and the drive pinion.

11. An axle assembly comprising:
   an electric motor having a rotor that is rotatable about an axis;
   a drive pinion that extends through the rotor and is rotatable about the axis;
   a gear reduction unit that includes:
      a first countershaft gear set that includes first, second, and third countershaft gears that are fixedly mounted to a first countershaft such that the first, second, and third countershaft gears are rotatable about a first countershaft axis with the first countershaft;
      a second countershaft gear set that includes first, second, and third countershaft gears that are fixedly mounted to a second countershaft such that the first, second, and third countershaft gears of the second countershaft gear set are rotatable about a second countershaft axis with the second countershaft; and a set of drive pinion gears that include first, second, and third gears are rotatable about the axis and that mesh with the first, second, and third countershaft gears of the first countershaft gear set, respectively, and that mesh with first, second, and third countershaft gears of the second countershaft gear set, respectively, wherein the first gear is operably connectable to the rotor, and the second and third gears are operatively connectable to the drive pinion;

a first clutch that selectively connects the rotor and the first gear;

a second clutch that selectively connects the second gear and the drive pinion;

a third clutch that selectively connects the third gear and the drive pinion; and a fourth clutch that selectively connects the rotor to the second gear.

12. The axle assembly of claim 11 wherein the first clutch and the fourth clutch are not engageable at the same time and the second clutch and the third clutch are not engageable at the same time.

13. The axle assembly of claim 11 wherein torque is transmitted between the electric motor and the drive pinion at a first gear ratio when the first clutch connects the rotor and the first gear, and the second clutch connects the second gear and the drive pinion.

14. The axle assembly of claim 13 wherein the third clutch does not connect the third gear and the drive pinion, and the fourth clutch does not connect the rotor and the second gear.

15. The axle assembly of claim 11 wherein torque is transmitted between the electric motor and the drive pinion at a second gear ratio when the third clutch connects the third gear and the drive pinion, and the fourth clutch connects the rotor and the second gear.

16. The axle assembly of claim 15 wherein the first clutch does not connect the rotor and the first gear, and the second clutch does not connect the second gear and the drive pinion.

17. The axle assembly of claim 11 wherein torque is transmitted between the electric motor and the drive pinion at a third gear ratio when the first clutch connects the rotor and the first gear, and the third clutch connects the third gear and the drive pinion.

18. The axle assembly of claim 17 wherein the second clutch does not connect the second gear and the drive pinion, and the fourth clutch does not connect the rotor and the second gear.

19. An axle assembly comprising:

an electric motor having a rotor that is rotatable about an axis;

a drive pinion that extends through the rotor and is rotatable about the axis;

a gear reduction unit that includes:

a first countershaft gear set that includes first, second, and third countershaft gears that are fixedly mounted to a first countershaft such that the first, second, and third countershaft gears are rotatable about a first countershaft axis with the first countershaft;

a second countershaft gear set that includes first, second, and third countershaft gears that are fixedly mounted to a second countershaft such that the first, second, and third countershaft gears of the second countershaft gear set are rotatable about a second countershaft axis with the second countershaft; and a set of drive pinion gears that include first, second, and third gears are rotatable about the axis and that mesh with the first, second, and third countershaft gears of the first countershaft gear set, respectively, and that mesh with first, second, and third countershaft gears of the second countershaft gear set, respectively, wherein the first gear is operably connectable to the rotor, and the second and third gears are operatively connectable to the drive pinion;

a first clutch that selectively connects the rotor and the first gear;

a second clutch that selectively connects the second gear and the drive pinion, wherein the second clutch selectively connects the second gear and the drive pinion via a connecting member that extends from the drive pinion and is rotatable about the axis with the drive pinion; and a third clutch that selectively connects the third gear and the drive pinion via the connecting member.

20. The axle assembly of claim 19 further comprising a fourth clutch that selectively connects the rotor to the second gear.

* * * * *